Patented Mar. 4, 1924.

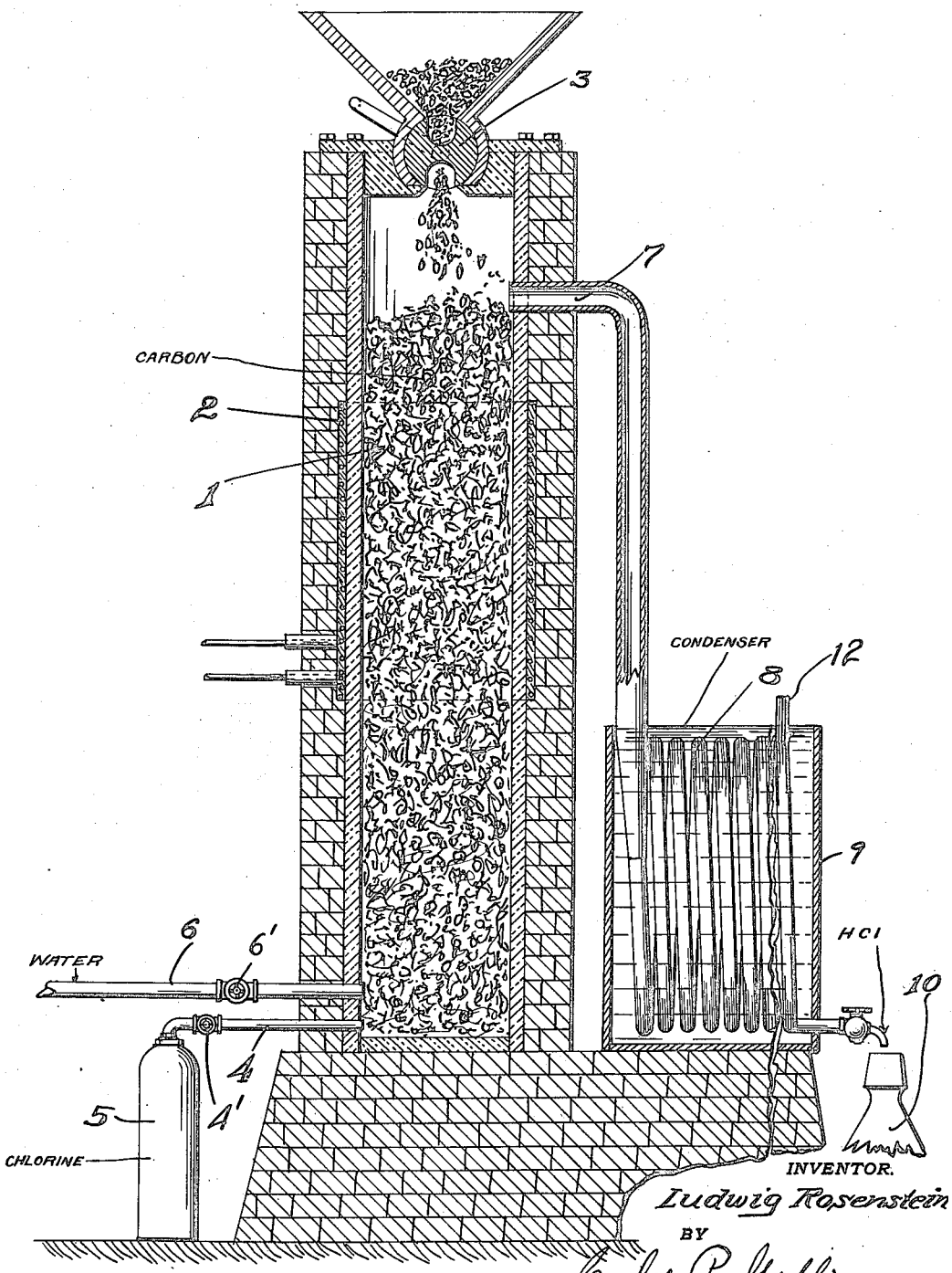

1,485,816

UNITED STATES PATENT OFFICE.

LUDWIG ROSENSTEIN, OF SAN FRANCISCO, CALIFORNIA, ASSIGNOR TO GREAT WESTERN ELECTRO CHEMICAL COMPANY, OF SAN FRANCISCO, CALIFORNIA, A CORPORATION OF CALIFORNIA.

PROCESS FOR THE PRODUCTION OF HYDROCHLORIC ACID DIRECT FROM CHLORINE.

Application filed August 1, 1921. Serial No. 488,759.

*To all whom it may concern:*

Be it known that I, LUDWIG ROSENSTEIN, a citizen of the United States, residing at San Francisco, in the county of San Francisco, State of California, have invented a new and useful Process for the Production of Hydrochloric Acid Direct from Chlorine, of which the following is a specification in such full and clear terms as will enable those skilled in the art to construct and use the same.

This invention relates to a process for the production of hydrochloric acid direct from chlorine. It will be understood by those skilled in the art that in the production of sodium hydrate from salt large quantities of chlorine are liberated and that the quantity of sodium hydroxide produced is limited by the possible economic use of the chlorine liberated, since the chlorine cannot be released in the atmosphere or condensed in water because of its many deleterious properties.

This process therefore, is intended to provide an additional outlet for this free chlorine and makes use of the following reaction:

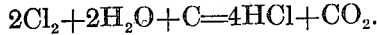

$$2Cl_2 + 2H_2O + C = 4HCl + CO_2.$$

The great disadvantage of carrying out the above reaction lies in the fact that about 1700 calories of heat are liberated per molecule of HCl produced and the heat is so great that the reacting mass tends to become overheated and solidify, or else it becomes so overheated as to destroy the apparatus in which the reaction takes place.

This invention lies in the control of the temperature by using an excess of water or steam to carry off the heat liberated; while at the same time the water or steam so added serves as the condensing agent for the hydrogen chloride gas formed and when passed through suitable cooling coils may be delivered therefrom in the form of commercial hydrochloric acid. This makes possible the elimination of the cumbersome absorption apparatus now used to produce hydrochloric acid, and a simple externally cooled condensing system is all that is needed to collect the acid.

Other objects of the invention will appear as the description proceeds.

In the drawing there is illustrated a vertical sectional view of an apparatus capable of carrying out the process.

The numeral 1 represents a stack having an interior lining of a suitable material such as silica to prevent the chlorine from attacking; which stack is preliminarily heated by means of the electrical heating coils 2.

At the top the stack is provided with a rotary feeding device 3 which enables the carbon to be placed in the stack without the loss of an undue amount of the gases passing therethrough. At the bottom there is a pipe 4 to deliver chlorine to the stack from the chlorine tank 5 or other source of supply, and there is also a steam pipe 6. The steam supply pipe as well as the chlorine supply pipe are provided with valves as indicated at 4′ and 6′ in order to accurately control the temperature of the stack, since accurate temperature control is an absolute essential for the proper application of the process.

Higher up on the side of the tank there is a discharge passage 7 which leads to the cooling coils 8 within the water tank 9 and from which coils the acid may be discharged in carboys 10.

In operation the stack is filled with carbon as nearly pure as possible and the stack is then heated by means of the coil 2 to such a temperature as will start the reaction, after which the reacting chlorine and carbon supplies all the heat that is required to carry out the reaction and the heat is regulated by reducing the quantity of chlorine and increasing the quantity of water or steam as may be necessary to prevent the stack from becoming overheated. The hot gases are then delivered through the passageway 7 to the condensing coil 8 after which the condensed hydrochloric acid is delivered to suitable receptacles 10.

The following table gives the data regarding the heating effect due to the reaction, the last column showing the heat which must be absorbed by excess steam and transfer of heat therefrom to keep the temperature constant.

Table I.

| Temp. °C. | Heat of reaction per molecular weight. | Heat to be absorbed by steam per molecular weight. |
|---|---|---|
| | Calories. | |
| 300° | 33,130 | 30,100 |
| 400° | 33,120 | 29,630 |
| 450° | 33,110 | 29,150 |
| 500° | 33,100 | 28,670 |

Table 2 shows the excess steam which must be used at various temperatures to keep the temperature constant, and also the strength of the acid which will issue from the condenser.

Table II.

| Temp. °C. | Excess steam required. | Acid strength from condenser. |
|---|---|---|
| | Times. | |
| 350° | 12.4 | 24.4 |
| 400° | 10.0 | 28.8 |
| 450° | 8.3 | 32.8 |
| 500° | 7.0 | 36.6 |

In this table the column labeled "Excess steam required" shows substantially the amount of steam in excess of the theoretical amount of steam required for the reaction that must be used to keep the reacting mass down to the temperature given. These figures are calculated upon the assumption that the radiation loss is negligibly small and experience shows this assumption to be justified.

The condenser system is made sufficiently long to thoroughly cool the hydrochloric acid produced and since the hydrochloric acid is very soluble in water it will be delivered from the cooler system as a solution while whatever gases such as $CO_2$ pass into the cooler system will be discharged therefrom through the open pipe 12 on the last coil.

Extended experiments with this process have disclosed the fact that to produce hydrochloric acid in large commercial quantities that the receptacle within which the carbon is contained must be kept below 750° centigrade above which temperature the apparatus is rapidly disintegrated and destroyed.

What I claim is as follows:

A method of producing hydrochloric acid and controlling the temperature during such process, which consists in passing chlorine through a mass of carbon heated to reacting temperature and introducing a sufficient volume of water to absorb the heat of reaction to such an extent as to keep the mass at the proper reaction temperature and below a temperature destructive to the furnace.

In testimony whereof I have hereunto set my hand this 21st day of July A. D. 1921.

LUDWIG ROSENSTEIN.